(12) United States Patent
Tillotson (10) Patent No.: US 10,543,933 B1
(45) Date of Patent: Jan. 28, 2020

(54) AIRCRAFT LIGHTING SYSTEM (71) Applicant: The Boeing Company, Chicago, IL (US)

(72) Inventor: Brian J. Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/141,064

(22) Filed: Sep. 25, 2018

(51) Int. Cl.
H05B 33/00 (2006.01)
B64D 47/06 (2006.01)
B64D 45/00 (2006.01)
B64D 47/08 (2006.01)
B64D 7/00 (2006.01)
H05B 37/02 (2006.01)
H04B 10/548 (2013.01)
H04L 29/08 (2006.01)
(Continued)

(52) U.S. Cl.
CPC ............... *B64D 47/06* (2013.01); *B64D 7/00* (2013.01); *B64D 45/00* (2013.01); *B64D 47/08* (2013.01); *H04B 10/548* (2013.01); *H05B 37/0227* (2013.01); *B64C 27/00* (2013.01); *B64C 29/00* (2013.01); *B64C 39/024* (2013.01); *B64C 2201/22* (2013.01); *B64D 2045/0095* (2013.01); *H04L 67/12* (2013.01)

(58) Field of Classification Search
CPC ........ G01S 17/936; G01S 17/10; G01S 17/89; G01S 7/4817; G01S 7/497; G01S 17/026; G01S 17/42; G01S 17/93; G01S 7/4808; G01S 7/4814; G01S 7/4815; G01S 7/484; G01S 7/4861; G01S 7/4863; G01S 7/4868; G01S 7/4876; G01S 7/4972; G01S 17/023; G01S 13/88; G01S 19/11; G01S 13/505; G01S 13/582; G01S 13/583; G01S 13/584; G01S 13/589; G01S 13/64; G01S 13/86; G01S 13/87; G01S 13/931; G01S 2013/9321; G01S 2013/9325; G01S 2013/9339; G01S 2013/9342; G01S 2013/9346; G01S 2013/935; G01S 2013/9353; G01S 2013/9357; G01S 2013/936; G01S 5/009; G01S 7/4004; G01S 19/13; G01S 13/91; G01S 13/9303; G01S 17/08; G01S 17/87; G01S 5/22; G01S 7/003; G01S 7/483; G01S 13/34; G01S 13/4463; G01S 13/4472; G01S 13/78; G01S 13/953; G01S 15/88; G01S 19/24; G01S 19/39; G01S 19/42; G01S 2013/0245; G01S 2013/0254; G01S 5/0009; G01S 5/0072; G01S 5/06; G01S 5/12; G01S 7/35; H02S 10/12; H02S 20/30; H02S 10/40; H02S 30/20; H02S 40/38
See application file for complete search history.

(56) References Cited

U.S. PATENT DOCUMENTS

2016/0282131 A1* 9/2016 Palfreyman ......... G01S 13/9303

* cited by examiner

*Primary Examiner* — Monica C King
(74) *Attorney, Agent, or Firm* — Yee & Associates, P.C.

(57) ABSTRACT

A method, apparatus, and system for automating detection and avoidance for an aircraft. A process activates a set of lamps visible on an exterior of an aircraft to emit light. The process modulates an intensity of light from the set of lamps at a set of frequencies that is detectable by a remote collision avoidance system in a remote aircraft during flight. The light from the set of lamps at the set of frequencies is perceived as continuous by a person looking at the aircraft in a sky, reducing visibility of the aircraft in the sky.

20 Claims, 7 Drawing Sheets (51) Int. Cl.
*B64C 39/02* (2006.01)
*B64C 27/00* (2006.01)
*B64C 29/00* (2006.01)

AIRCRAFT LIGHTING SYSTEM

BACKGROUND INFORMATION

1. Field

The present disclosure relates generally to an improved aircraft and, in particular, to a lighting system for the aircraft.

2. Background

Aircraft are commonly used for long distance transportation between cities, states, or countries. People commonly employ aircraft for personal and business travel. Additionally, many companies also transport cargo using aircraft.

The wide use of aircraft has an environmental impact. Aircraft engines emit air pollution in the form of heat, noise, particulates, and gases which can affect the environment. Even with reductions in emissions from automobiles and more efficient aircraft, the rapid growth of air travel has contributed to an increase in pollution that is attributable to the air travel.

Further, with advances in efficiency and innovations for engines, airframes, and aerodynamics to reduce air pollution, new types of air travel enabled by these advances and innovations can result in new types of pollution. For example, with innovations in electric motors, unmanned aerial vehicles, personal air vehicles, and electric vertical take-off and landing vehicles are being designed and proposed for use in new innovative ways. For example, air taxiing systems are being proposed for use within residential and urban areas.

Increased use of aircraft such as unmanned aerial vehicles for delivering packages, personal air vehicles for localized travel, and other uses increases density of aircraft in areas of use. This increased density increases the visibility of aircraft to people on the ground. These and other types of uses of aircraft increase visual clutter, which causes an additional type of pollution such as sight pollution.

Sight pollution is the undesired view of aircraft by persons on the ground. For example, having hundreds of aircraft cluttering a scenic view increases the sight pollution for people.

Therefore, it would be desirable to have a method and apparatus that take into account at least some of the issues discussed above, as well as other possible issues. For example, it would be desirable to have a method and apparatus that overcome a technical problem with reducing the visibility of aircraft to people on the ground.

SUMMARY

An embodiment of the present disclosure provides an aircraft lighting system comprising a set of lamps visible on an exterior of an aircraft and a controller in the aircraft. The controller activates the set of lamps to emit light and modulates an intensity of the light from the set of lamps at a set of frequencies that is detectable by a remote collision avoidance system in a remote aircraft during flight. The light from the set of lamps at the set of frequencies is perceived as continuous by a person looking at the aircraft in a sky, reducing visibility of the aircraft in the sky.

Another embodiment of the present disclosure provides a lighting system comprising a set of lamps visible on an exterior of a ground structure and a controller. The controller activates the set of lamps to emit light and modulates an intensity of the light at a set of frequencies detectable by a sensor system in an aircraft during flight of the aircraft. The light from the set of lamps at the set of frequencies is perceived as continuous by a person looking at the set of lamps.

Yet another embodiment of the present disclosure provides a method for automating detection and avoidance for an aircraft. The process activates a set of lamps visible on an exterior of an aircraft to emit light. The process modulates an intensity of light from the set of lamps at a set of frequencies that is detectable by a remote collision avoidance system in a remote aircraft during flight. The light from the set of lamps at the set of frequencies is perceived as continuous by a person looking at the aircraft in a sky, reducing visibility of the aircraft in the sky.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that in addition to sight pollution from increased density of aircraft in areas such as cities, this increased density also can increase issues in avoiding collisions. The illustrative embodiments recognize and take into account that for piloted aircraft, detecting and avoiding collisions can rely on human vision. The illustrative embodiments also recognize and take into account that with advanced aircraft, cameras may be used in collision detection systems to avoid collisions with other aircraft or objects.

The illustrative embodiments recognize and take into account that current techniques include implementing navigation lights and flashing lights on aircraft. The illustrative embodiments recognize and take into account that these flashing lights are seen as flashing by people which can increase sight pollution. Further, the illustrative embodiments recognize and take into account that current use of flashing lights is at a rate that is low enough such that sensor systems in computer systems in aircraft may have difficulty in recognizing these lights as being located on an aircraft in an urban background in which flashing lights are present. Further, urban areas include moving lights from vehicles which further increases the difficulty in recognizing the lights on the aircraft.

Thus, the illustrative embodiments provide a method, apparatus, and system for automating detection and avoidance for an aircraft while reducing sight pollution. In one illustrative example, lamps visible on an exterior of an aircraft are activated to emit light. An intensity of the light from the lamps is modulated at a set of frequencies that is detectable by a remote collision avoidance system in a remote aircraft during flight. This modulated light from the lamps at the set of frequencies is perceived as continuous by a person looking at the aircraft in a sky, reducing visibility of the aircraft in the sky to people on the ground.

Figure 1:
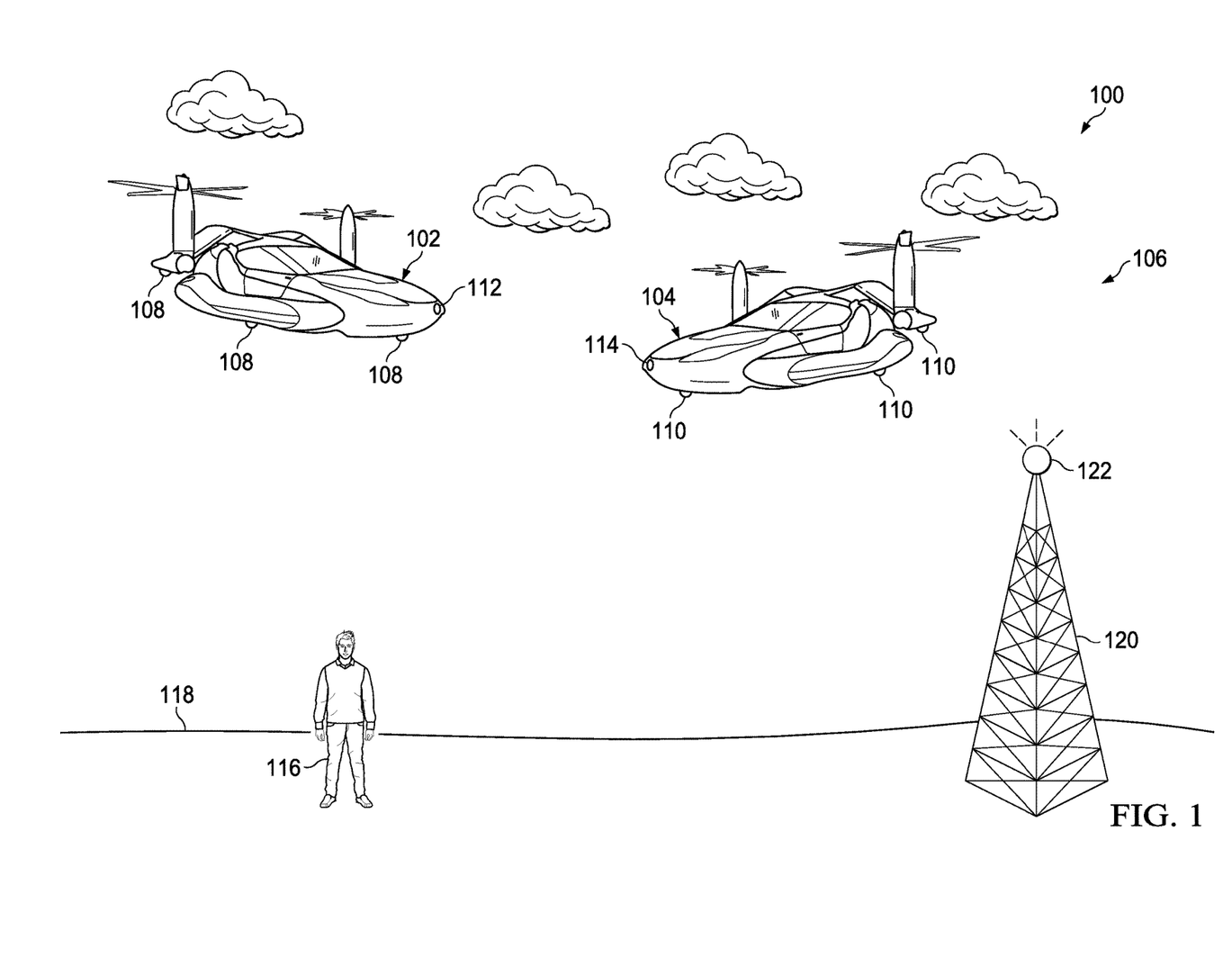
FIG. 1 is a pictorial illustration of an aircraft environment in accordance with an illustrative embodiment.

With reference now to FIG. 1, a pictorial illustration of an aircraft environment is depicted in accordance with an illustrative embodiment. In this illustrative example, aircraft environment 100 includes personal air vehicle 102 and personal air vehicle 104 flying in sky 106. As depicted, personal air vehicle 102 and personal air vehicle 104 can each carry a number of people as passengers.

Personal air vehicle 102 and personal air vehicle 104 can each utilize at least one of an electric propulsion system or a combustion propulsion system. Personal air vehicle 102 and personal air vehicle 104 can include vertical take-off and landing capabilities. These personal air vehicles can be piloted or pilotless depending on the particular implementation.

As depicted, personal air vehicle 102 has lamps 108, and personal air vehicle 104 has lamps 110. A lamp is a hardware device that emits light. In this illustrative example, personal air vehicle 102 has camera 112, and personal air vehicle 104 has camera 114.

In this illustration, person 116 is on ground 118. Person 116 looks at personal air vehicle 102 and personal air vehicle 104 in sky 106. As depicted, lamps 108 for personal air vehicle 102 and lamps 110 for personal air vehicle 104 each emit light at a frequency. In this illustrative example, the frequency is the speed at which these lamps alternate intensity from one amplitude to another and back.

The speed is based on how long the intensity remains at an amplitude before changing to another amplitude and then back to the first amplitude. For example, a lamp may have a first intensity and change to a second intensity and then back to the first intensity after $\frac{1}{100}$ seconds which is a frequency of 100 Hz.

The light is emitted at a frequency such that person 116 looking at personal air vehicle 102 and personal air vehicle 104 perceives the light emitted from these lamps as being continuous instead of flashing or flickering. Perception of lamps 108 on personal air vehicle 102 and lamps 110 on personal air vehicle 104 reduces visibility of personal air vehicle 102 and personal air vehicle 104 to person 116 looking at these vehicles in sky 106. Additionally, wavelengths of the light from personal air vehicle 102 and personal air vehicle 104 can be changed to reduce visibility of these personal air vehicles to person 116.

This perception of the light from personal air vehicle 102 and personal air vehicle 104 reduces at least one of visual clutter or sight pollution. As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Further, a frequency at which lamps 108 on personal air vehicle 102 and lamps 110 on personal air vehicle 104 change intensity is detectable by sensors in addition to being perceived as continuous by person 116.

For example, camera 112 on personal air vehicle 102 can detect a change in intensity of the light emitted from lamps 110 on personal air vehicle 104. In a similar fashion, camera 114 on personal air vehicle 104 can detect the change in the intensity of the light from lamps 108 on personal air vehicle 102.

The detection of the change in the intensity can be used for a number of different purposes. For example, the change in the intensity can be used to indicate that the light is from an aircraft as opposed to the light being from some other source that may be on the ground.

Further, the frequency at which the light changes the intensity can be used to communicate information. The information can include, for example, an aircraft identifier, a type of aircraft, an altitude, a heading, or other suitable information. The information can be any information used to avoid collisions, coordinate aircraft traffic, or other operations with respect to the aircraft. Moreover, wavelengths of the light emitted from lamps 108 on personal air vehicle 102 and lamps 110 on personal air vehicle 104 can be changed to communicate the information.

As depicted, radio tower 120 is a structure on ground 118. Radio tower 120 has lamp 122. In this example, lamp 122 emits light that has an intensity that is modulated at a set of frequencies such that modulated light is detectable by a sensor system in an aircraft during flight of the aircraft, such as camera 112 for personal air vehicle 102 and camera 114 for personal air vehicle 104. The light can be modulated to transmit information to these personal air vehicles. Further the light from lamp 122 at the set of frequencies is perceived as continuous by person 116 looking at lamp 122.

Thus, the example in FIG. 1 makes aircraft less visible to people on the ground. This effect reduces sight pollution while making the aircraft more visible to other aircraft. These features can be especially useful with increased traffic from unmanned aerial vehicles delivering packages, personal air vehicles carrying people, and other air traffic that can be found in urban areas, cities, downtown areas, business districts, neighborhoods, and other populated areas.

The illustration of aircraft environment 100 in FIG. 1 is one illustrative example and not meant to limit the manner in which other illustrative examples can be implemented. For example, other numbers of personal air vehicles can be present in addition to personal air vehicle 102 and personal air vehicle 104. For example, 10, 20, or 50 personal air vehicles can also be preset in in sky 106 within the view of person 116.

Other types of aircraft also may be used in addition or in place of the personal air vehicles. For example, unmanned aerial vehicles such as delivery drones may be present. As another example, the aircraft may include commercial airliners.

Figure 2:
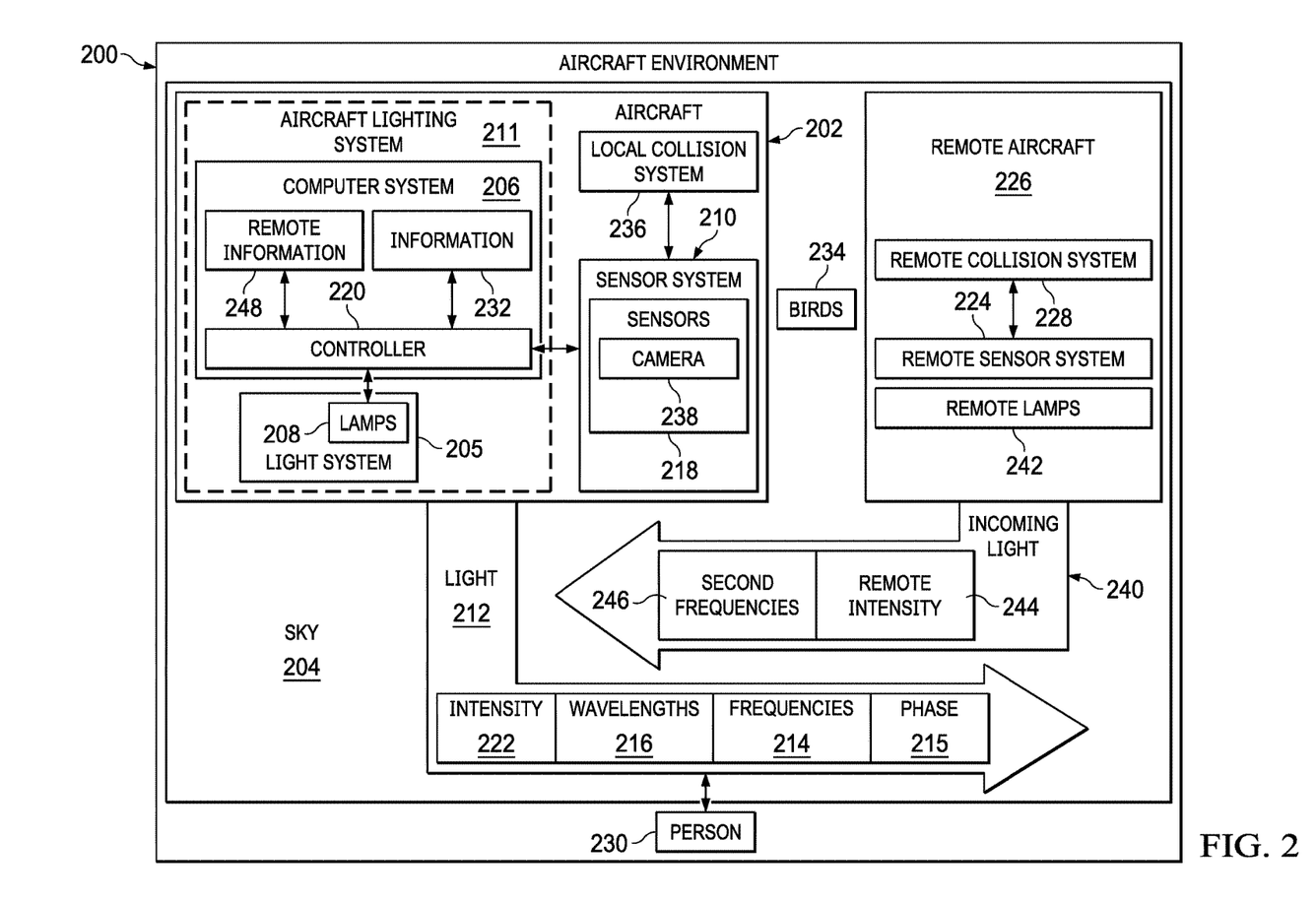
FIG. 2 is an illustration of a block diagram of an aircraft environment in accordance with an illustrative embodiment.

With reference next to FIG. 2, an illustration of a block diagram of an aircraft environment is depicted in accordance with an illustrative embodiment. In this illustrative example, aircraft environment 200 includes aircraft 202, which flies in sky 204. Aircraft 202 can be selected from a group including an airplane, a commercial airplane, an unmanned aerial vehicle, a rotocraft, a vertical take-off and landing vehicle, an electric vertical take-off and landing vehicle, a personal air vehicle, a driverless personal air vehicle, or some other type of aircraft.

Aircraft 202 includes a number of different components. As depicted, aircraft 202 includes light system 205, sensor system 210, and computer system 206.

Light system 205 includes a set of lamps 208. As used herein, "a set of," when used with reference to items, means one or more items. For example, "a set of lamps 208" is one or more of lamps 208. The set of lamps 208 is a set of hardware devices that is visible on an exterior of aircraft 202. The set of lamps 208 emits light 212. In this depicted example, the set of lamps 208 emits light 212 at a set of frequencies 214 and a set of wavelengths 216. In this example, light 212 includes phase 215, which is a position on a point in time on a waveform cycle.

The set of lamps 208 can be located in a number of different locations in which the set of lamps 208 is visible on the exterior of aircraft 202. Visibility is such that light 212 emitted from the set of lamps 208 can be detected by person 230 and remote sensor system 224 in remote aircraft 226. For example, the locations can be selected for the set of lamps 208 such that light 212 can be seen by person 230 on the ground looking at aircraft 202 in sky 204. In this illustrative example, light 212 is controlled to reduce a visual contrast between aircraft 202 and sky 204 when viewed by person 230.

In one illustrative example, the set of lamps 208 can be on aircraft 202 in one or more locations selected from at least one of a port side relative to a direction of travel, a starboard side relative to the direction of travel, a leading edge of a wing, a trailing edge of a wing, a wing tip, or a waterline of a fuselage. The set of lamps 208 can be selected from at least one of a light-emitting diode, a solid-state light emitter, a laser diode, a xenon flash lamp, a gas discharge lamp, or a halogen lamp.

By being visible on an exterior of aircraft 202 does not mean that the set of lamps 208 has to be mounted on the exterior of aircraft 202. For example, a lamp in the set of lamps 208 can be mounted in a transparent fairing on the exterior of aircraft 202.

In this example, sensor system 210 is comprised of a set of sensors 218. As depicted, the set of sensors 218 includes sensors that detect light. The set of sensors 218 is selected from at least one of a camera, a photodetector, a photo sensor, an active pixel sensor, an image sensor, a charge coupled device (CCD), a quantum dot photodiode, or other suitable types of light sensors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

In this illustrative example, controller 220 in computer system 206 is electrically connected to light system 205 and sensor system 210. As depicted, electrical connection facilitates communication of data and sending commands to control light system 205 and sensor system 210. In this example, computer system 206 with controller 220 and light system 205 forms aircraft lighting system 211.

As depicted, controller 220 activates the set of lamps 208 in light system 205 to emit light 212. Further, controller 220 controls light system 205 to modulate intensity 222 of light 212 from the set of lamps 208 at the set of frequencies 214 that is detectable by remote sensor system 224 in remote aircraft 226 during flight of aircraft 202. Remote collision system 228 is in communication with remote sensor system 224 and can take actions based on detecting light 212 emitted from the set of lamps 208 on aircraft 202.

In modulating light 212 to have different intensities, controller 220 controls intensity 222 of light 212 to have different amplitudes. For example, intensity 222 can be modulated to have amplitudes that switch between 0 percent and 100 percent. In another example, intensity 222 can be modulated to have amplitudes that switch between 20 percent and 70 percent.

In this example, light 212 from the set of lamps 208 at the set of frequencies 214 is perceived as continuous by person 230 looking at aircraft 202 in sky 204. A threshold frequency at which light 212 is perceived as continuous or constant is a flicker fusion threshold. In other words, the set of frequencies 214 is such that intensity 222 of light 212 changes too fast for human perception to notice that intensity 222 is changing. As a result, the perception of light 212 as continuous reduces visibility of aircraft 202 in sky 204. This perception can reduce the visibility of aircraft 202 to person 230 viewing aircraft 202 in sky 204. A flicker fusion threshold in a human, such as person 230, is typically about 60 Hz.

Further, the set of frequencies 214 can be selected such that the change in intensity 222 of light 212 can be detected by remote sensor system 224. For example, the set of frequencies 214 can be selected to be about one half of the frame rate of a camera in remote sensor system 224. For example, the set of frequencies 214 can be selected as 15 Hz for the camera having a detection speed of 30 frames per second (FPS). Alternatively, the set of frequencies 214 can be selected to be aliased to about one half of the frame rate of a camera in remote sensor system 224. For example, the set of frequencies 214 can be selected as 85 Hz for the camera having a detection speed of 30 frames per second.

The communication of information 232 can be performed in a number of different ways. For example, the set of frequencies 214 can be changed to transmit a binary stream of data in light 212.

In another illustrative example, the set of frequencies 214 is selected to indicate a location of the set of lamps 208 on the exterior of aircraft 202. For example, a lamp in the set of lamps 208 on the left side of aircraft 202 can have a frequency of 60 Hz in the set of frequencies 214, while a lamp in the set of lamps 208 on the right side of aircraft 202 can have a frequency of 80 Hz in the set of frequencies 214. The left and right can be, for example, relative designations with respect to a direction of travel of aircraft 202. In other, the frequencies of these two lamps can change if the aircraft 202 moves in the reverse direction.

As another illustrative example, controller 220 controls a set of wavelengths 216 for the set of lamps 208 in light system 205. With respect to visibility of aircraft 202 to person 230, controller 220 can control the set of wavelengths 216 of light 212 emitted from the set of lamps 208 to reduce the visibility of aircraft 202. Further, the set of wavelengths 216 can include infrared wavelengths from about 700 nm to 1 μm.

For example, the set of wavelengths 216 of light 212 can be changed as sky 204 changes color to reduce visibility of aircraft 202 to person 230 looking at aircraft 202 in sky 204. For example, sensor system 210 can include a camera that generates images of sky 204. These images can be analyzed to determine the color of sky 204 and select the set of wavelengths 216 based on the current color of sky 204. The set of wavelengths 216 of light 212 be changed to have a color corresponding to that of sky 204. A similar change can be made with respect to an actual intensity. For example, the amplitude or maximum value for intensity 222 can be set based on sky 204.

For example, when sky 204 behind aircraft 202 is clear and illuminated by midday sunlight, the set of wavelengths 216 comprises primarily blue wavelengths and intensity 222 is selected to give a visual impression of high brightness, similar to sky 204, when intensity is averaged over the lamp and portions of aircraft 202 visible to person 230. In another example, when sky 204 behind aircraft 202 is cloudy and illuminated by sunset, the set of wavelengths 216 comprises primarily red wavelengths and intensity 222 is selected to give a visual impression of lower brightness.

With the dynamic changing of the set of wavelengths 216, the reduced visibility can be maintained for aircraft 202 as the color of sky 204 changes. In this manner, the sight pollution can be more effectively reduced in the illustrative examples.

In this illustrative example, information 232 can be transmitted through light 212 being emitted from the set of lamps 208 at the set of frequencies 214. Information 232 is selected from at least one of an aircraft identifier, an aircraft type, an altitude, a climb rate, a descent rate, a heading, a radio frequency channel, a low fuel condition, a low battery condition, an emergency condition, or other suitable information. Information 232 can also be a communication such as a request for remote aircraft 226 to descend, turn left, or perform some other requested change in heading.

In the illustrative example, a probability of a bird strike from birds 234 viewing light 212 at the set of frequencies 214 from the set of lamps 208 can be reduced. For example, some birds have a flicker fusion threshold from about 90 Hz to about 110 Hz. Light 212 modulated above these frequencies is perceived as continuous. Selecting the set of frequencies 214 that is perceived as flickering to birds 234 may draw attention in a manner that causes birds 234 to take an action such as moving away from aircraft 202 or any course of action that reduces the odds of the bird strike.

For example, birds 234 may be able to determine that light 212 is flashing at a frequency range from about 75 Hz to about 105 Hz. As a result, using the set of frequencies 214 that are about 75 Hz to about 105 Hz or less enables birds 234 to see light 212 from the set of lamps 208 as being flashing. The set of frequencies 214 can be less than these frequencies but equal to or greater than 60 Hz such that person 230 views light 212 as being continuous.

A frequency of about 75 Hz is about midway between 2× and 3× multiples of a 30 Hz frame rate for many cameras. This frequency provides a desirable strength for detecting light 212 with an alias frequency of 15 Hz. Further, 75 Hz is fairly well separated from the 120 Hz background frequency at which electric lights flicker in countries such as the United States, which aliases near 0 Hz in a 30 frame rate camera, and from the 100 Hz frequency for lights in Europe, which aliases near 10 Hz in a 30 frame rate camera. A frequency of 105 Hz is midway between 3× and 4× multiples of 30 Hz for a camera.

In the illustrative example, a number of factors can be considered for the set of frequencies 214 for an undersampled system when the set of frequencies 214 for the set of lamps 208 is not an integer multiple of the camera's Nyquist frequency and a temporal filter is applied at a matching frequency that is not 15 Hz. These considerations include at least one of a temporal width of a lamp flash, the temporal width of the camera's sampling time (which may be any fraction of one frame time), temporal jitter in a flash timing or a camera sampling interval, or whether a sampled source (i.e. the lamp) is synchronized to a sampler (i.e. the camera) by an external timing reference such as provided by a global positioning system (GPS).

In still another illustrative example, a higher frame rate camera in remote sensor system 224 can operate with a higher frequency for the set of frequencies 214 for the set of lamps 208. For example, the camera may have a frame rate of 1000 frames per second (fps) and a frequency for the set of lamps 208 may be 500 Hz. This situation can enable the camera in remote sensor system 224 of remote aircraft 226 to detect light 212 from the set of lamps 208 faster than the lower frequency such as 80 Hz. Further, these frequencies can also increase the rate at which information can be transmitted.

In yet another illustrative example, sensor system 210 can be used with or may be part of local collision system 236 for aircraft 202. For example, sensor system 210 may include camera 238. With this illustrative example, controller 220 controls camera 238 to detect incoming light 240 transmitted from a set of remote lamps 242 on remote aircraft 226. As depicted, incoming light 240 has remote intensity 244 that is modulated at a set of second frequencies 246. Controller 220 identifies remote information 248 from incoming light 240 based on remote intensity 244 of incoming light 240 that is modulated at the set of second frequencies 246.

As a result, computer system 206 operates as a special purpose computer system in which controller 220 in computer system 206 enables controlling the frequency at which intensity 222 of light 212 changes amplitude in a manner that is perceived as continuous by person 230 viewing aircraft 202 but still detectable as changing intensities by remote sensor system 224 to distinguish aircraft 202 from other sources of light such as those on the ground. Further, the set of frequencies 214 can be selected to distinguish from frequencies that could be used by objects on the ground such as vehicles. In particular, controller 220 transforms computer system 206 into a special purpose computer system as compared to currently available general computer systems that do not have controller 220.

Figure 3:
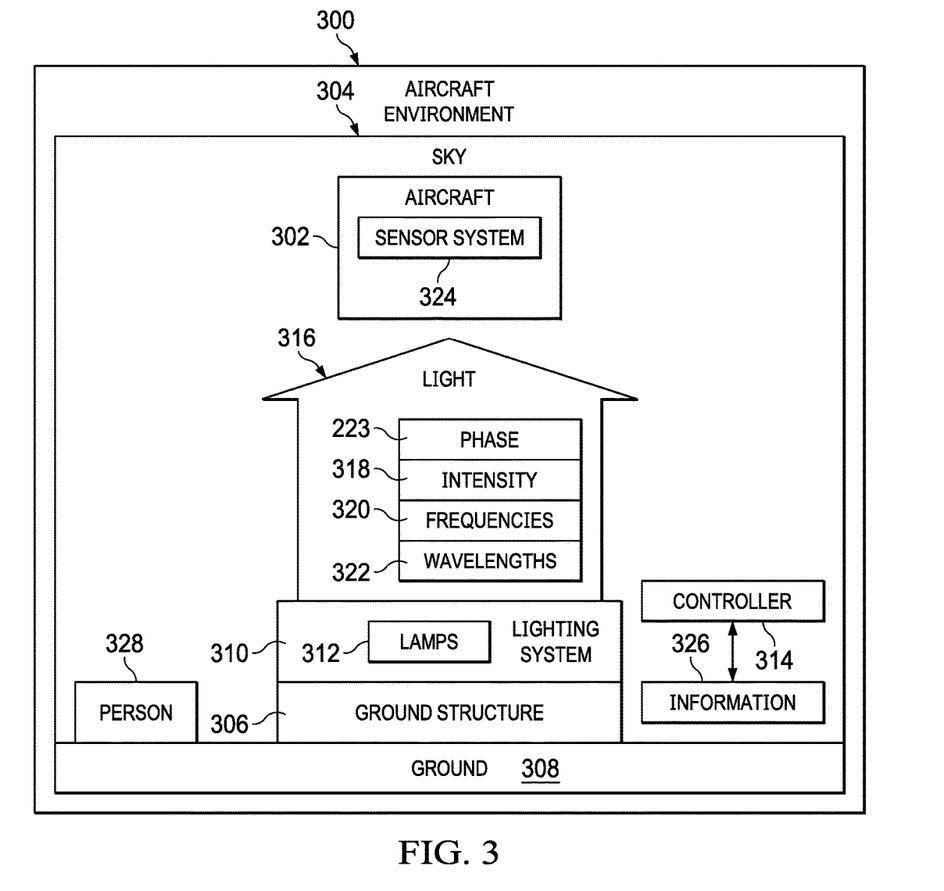
FIG. 3 is an illustration of a block diagram of an aircraft environment in accordance with an illustrative embodiment.

With reference next to FIG. 3, an illustration of a block diagram of an aircraft environment is depicted in accordance with an illustrative embodiment. In this illustrative example, aircraft environment 300 includes aircraft 302 flying in sky 304.

In this illustrative example, ground structure 306 is located on ground 308. Ground structure 306 can take a number of different forms. For example, ground structure 306 can be selected from a group including a water tower, a radio tower, a wind turbine, a dam, a building, or some other suitable type of structure.

Ground structure 308 has lighting system 310 (e.g. light system). As depicted, lighting system 310 comprises a set of lamps 312. Controller 314 controls operation of lighting system 310. In some examples, controller 314 can be part of lighting system 310.

The set of lamps 312 is located such that the set of lamps 312 is visible on the exterior of ground structure 306. The set of lamps 312 emit light 316 with intensity 318 in which intensity 318 can be modulated to change at a set of frequencies 320. Further, the set of lamps 312 can be controlled by controller 314 to emit light 316 with a set of wavelengths 322. In this example, light 316 includes phase 223, which is a position on a point in time on a waveform cycle.

As depicted, the controller 314 is a hardware device and can be located in or remote to ground structure 306. Controller 314 activates the set of lamps 312 to emit light 316. As depicted, controller 314 modulates intensity 318 of light 316 at a set of frequencies 320 that are detectable as changing by sensor system 324 in aircraft 302 during flight of aircraft 302.

As depicted, intensity 318 of light 316 at the set of frequencies 320 can be modulated to transmit information 326. Further, light 316 from the set of lamps 312 at the set of frequencies 320 is perceived as continuous by person 328 looking at the set of lamps 312 in lighting system 310.

Controller 220 in FIG. 2 and controller 314 can be implemented in software, hardware, firmware or a combination thereof. When software is used, the operations performed by controller 220 and controller 314 can be implemented in program code configured to run on hardware, such as a processor unit. When firmware is used, the operations performed by controller 220 and controller 314 can be implemented in program code and data and stored in persistent memory to run on a processor unit. When hardware is employed, the hardware may include circuits that operate to perform the operations in controller 220 and controller 314.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with reducing visibility of aircraft to people on the ground. Further, one or more technical solutions are present that also overcome a technical problem with detecting other aircraft.

As a result, one or more technical solutions may provide a technical effect of emitting light in a manner that is perceived as continuous by people on the ground such that the contrast between the aircraft and the sky is reduced while also emitting the light in a manner that allows other aircraft to distinguish the light from other sources.

Figure 4:
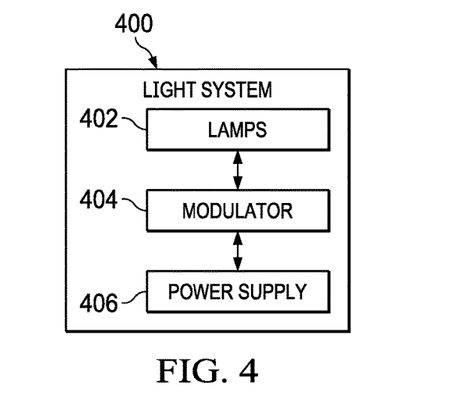
FIG. 4 is an illustration of a block diagram of a light system in accordance with an illustrative embodiment.

With reference next to FIG. 4, an illustration of a block diagram of a light system is depicted in accordance with an illustrative embodiment. Light system 400 is an example of one implementation for light system 205 in FIG. 2 and lighting system 310 in FIG. 3. In this illustrative example, light system 400 includes a set of lamps 402, modulator 404, and power supply 406.

The set of lamps 402 is one or more lamps that can be positioned on an aircraft or ground structure. The lamps are in a position in a manner that can be perceived by a person viewing the aircraft in the sky with a ground structure as well as detectable by a sensor system for an aircraft flying in the sky.

The configurations of the set of lamps 402 can take a number of different forms. For example, two lamps may be implemented in the set of lamps 402. Two lamps may emit light using at least one of different intensities, different frequencies, or different wavelengths. The combination of these parameters is selected to make the aircraft less visible to people on the ground but still detectable by other aircraft.

In another illustrative example, two lamps may be mounted on a leading edge of wingtips. The lamps may be modulated at the same frequency but 180 degrees out of phase in which the set of frequencies for these two lamps are perceived as being a constant light by people viewing the aircraft. The set of frequencies can be selected such that birds will clearly see the lamps on the aircraft. The separation between the two lamps can provide a visual cue to a rate of approach, reducing the probability of a bird strike.

In still another illustrative example, two lamps may be facing different sides and modulated at different frequencies. For example, the two lamps may be placed on the port and starboard sides of a fuselage of an aircraft. The set of frequencies is selected such that a sensor system in another aircraft can determine whether the lamp detected is on the port side or starboard side.

In another illustrative example, the two lamps may have overlapping fields of illumination such as on a front of aircraft. With this overlap, the sensor system on a remote aircraft can measure the difference in visual intensity to compute an estimate of an orientation of the aircraft on which the lights are located.

In yet another illustrative example, the lamps may be configured to emit more light at an angle below a horizon as opposed to above the horizon when an aircraft is in level flight. The lamps can be configured to illuminate in many lateral directions. In this manner, increased coverage may be provided for reducing sight pollution by people looking at the aircraft in the sky. This illustrative example takes into account that relatively few people are in an area within 70 degrees from the nadir below the aircraft, while relatively many people are in the area from 70 degrees off nadir out to the horizon. This configuration takes into account that most people look at near horizon directions rather than straight up.

In the illustrative example, the set of lamps 402 can be selected from at least one of a light-emitting diode, a solid-state light emitter, a laser diode, a xenon flash lamp, a gas discharge lamp, a halogen lamp, or some other suitable type of lamp. In this example, the gas discharge lamp is a device that uses one or more types of noble gases through which electrical discharge is sent. Additionally, mercury, sodium, meta halides, or other substances can be included which vaporize to become part of the gas mixture.

As depicted, modulator 404 is a hardware device that connects power supply 406 to lamps 402 such that power supply 406 can supply current causing lamps 402 to emit light. Further, modulator 404 operates to modulate at least one of the frequency or the wavelength of light emitted by lamps 402. The set of lamps 402 can be individually modulated in these illustrative examples. For example, a first lamp can be modulated to have a frequency of 60 Hz, while a second lamp can be modulated to have a frequency of 90 Hz. In this example, the frequency is how fast the intensities change between two or more amplitudes.

As depicted, power supply 406 provides power to lamps 402. In this illustrative example, power supply 406 can take a number of different forms. For example, power supply 406 can be selected from at least one of a battery, a solar cell, an auxiliary power unit (APU), an electric generator coupled to an engine, or some other suitable type of power source. In this illustrative example, modulator 404 can be controlled by a controller such as controller 220 in FIG. 2 or controller 314 in FIG. 3.

The illustrations of components in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, light system 400 may include a controller such as controller 220 or controller 314 in some implementations. As another example, the selection of the set of frequencies may be made to allow for detection of an aircraft by another aircraft and reduce sight pollution. The selection of the frequency may omit taking into account at least one of reducing the probability of a bird strike or actively transmitting data other than indicating the presence of an aircraft.

Figure 5:
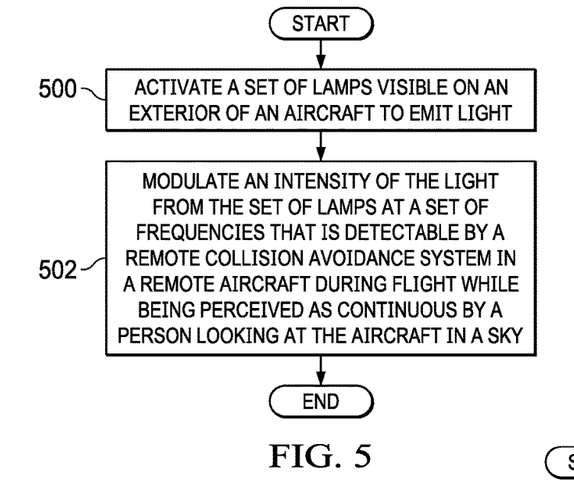
FIG. 5 is an illustration of a flowchart of a process for automating detection and avoidance for an aircraft in accordance with an illustrative embodiment.

Turning next to FIG. 5, an illustration of a flowchart of a process for automating detection and avoidance for an aircraft is depicted in accordance with an illustrative embodiment. The process illustrated in FIG. 5 can be implemented in controller 220 to control light system 205 for aircraft 202 in FIG. 2.

The process begins by activating a set of lamps visible on an exterior of an aircraft to emit light (operation 500). The process continues by modulating an intensity of the light from the set of lamps at a set of frequencies that is detectable by a remote collision avoidance system in a remote aircraft during flight while being perceived as continuous by a person looking at the aircraft in a sky (operation 502). The process terminates thereafter. The process in this flowchart provides an ability to distinguish a flying aircraft from other objects or sources while also reducing sight pollution for people on the ground.

Figure 6:
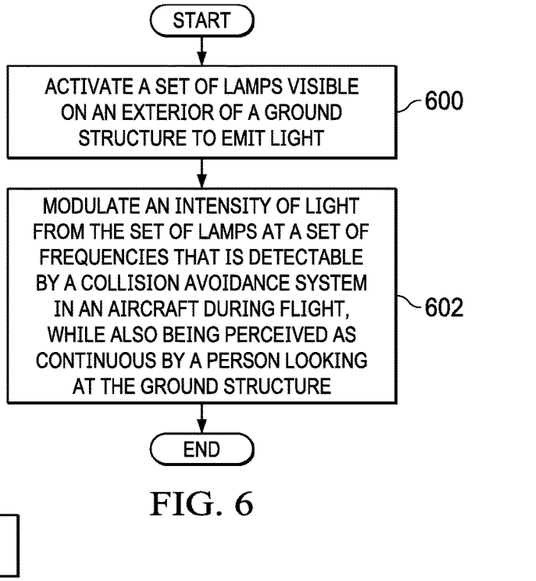
FIG. 6 is an illustration of a flowchart of a process for automating detection and avoidance for an aircraft with a ground structure in accordance with an illustrative embodiment.

Turning next to FIG. 6, an illustration of a flowchart of a process for automating detection and avoidance for an aircraft with a ground structure is depicted in accordance with an illustrative embodiment. The process illustrated in FIG. 6 can be implemented in controller 314 to control lighting system 310 for ground structure 306 in FIG. 3.

The process begins by activating a set of lamps visible on an exterior of a ground structure to emit light (operation 600). The process continues by modulating an intensity of light from the set of lamps at a set of frequencies that is detectable by a collision avoidance system in an aircraft during flight, while also being perceived as continuous by a person looking at the ground structure (operation 602). The process terminates thereafter. This process reduces visibility of the ground structure while providing an ability for aircraft to determine that the ground structure may have an elevation that requires a change in direction of travel of the aircraft.

Figure 7:
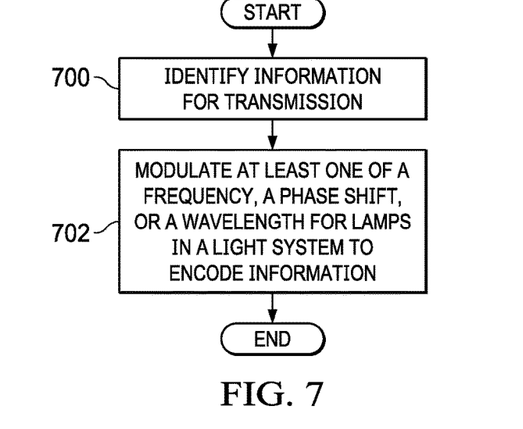
FIG. 7 is an illustration of a flowchart of a process for transmitting information using light in accordance with an illustrative embodiment.

In FIG. 7, an illustration of a flowchart of a process for transmitting information using light is depicted in accordance with an illustrative embodiment. The process illustrated in FIG. 7 can be implemented in controller 220 to control light system 205 for aircraft 202 in FIG. 2.

The process begins by identifying information for transmission (operation 700). The process continues by modulating at least one of a frequency, a phase shift, or a wavelength for lamps in a light system to encode information (operation 702). The process terminates thereafter. In this illustrative example, the frequency is the rate at which the amplitude for the intensity of light is changed. The wavelength also can be changed to encode the information in the illustrative examples.

As another example, the information can be encoded using phase shift, in addition to or in place of wavelength modulation and amplitude modulation. The information can be, for example, an aircraft identifier, an aircraft type, an altitude, a climb rate, a descent rate, a heading, a radio frequency channel, a low fuel condition, or other suitable information. In this example, the phase shift is the change in amplitude. The change in amplitude can be several milliseconds in contrast to a phase shift of individual light waves. In this manner, communications between an aircraft is enabled without requiring a radio communication channel to be established between the aircraft.

Figure 8:
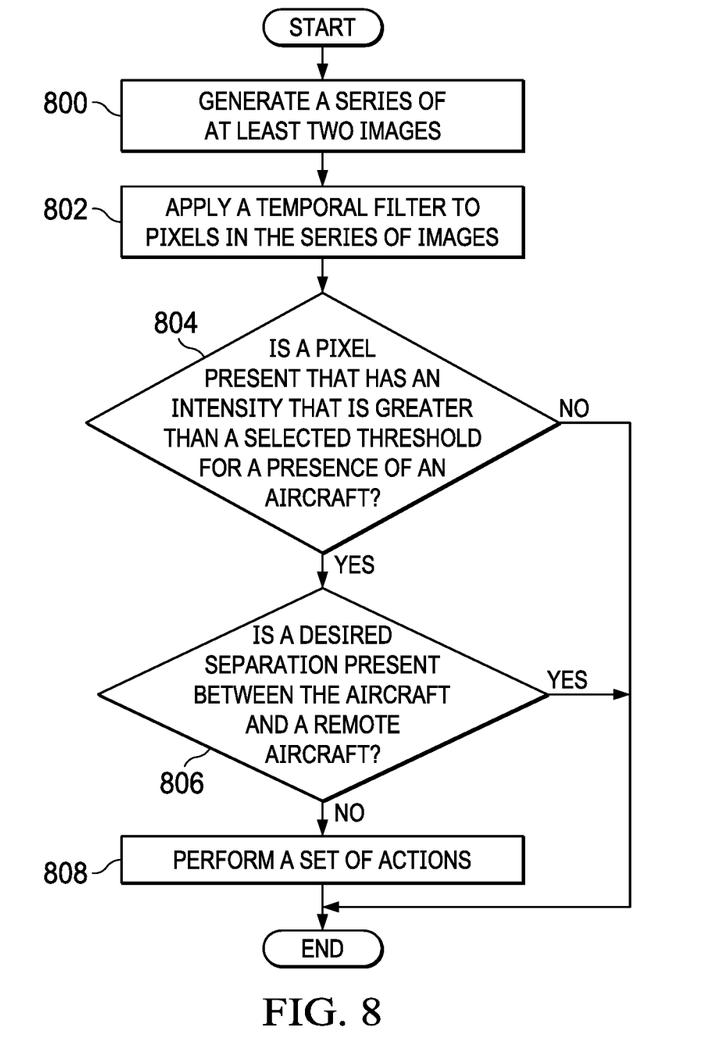
FIG. 8 is an illustration of a flowchart of a process for detecting an aircraft in accordance with an illustrative embodiment.

With reference now to FIG. 8, an illustration of a flowchart of a process for detecting an aircraft is depicted in accordance with an illustrative embodiment. The process illustrated in FIG. 8 can be implemented in controller 220 of aircraft 202 in FIG. 2.

The process begins by generating a series of at least two images (operation 800). In this example, each image is a grid of pixels. In this example, the flashing lamp may be a lamp in lamps 208 with the image being generated by a camera in remote sensor system 224 in FIG. 2.

The process applies a temporal filter to pixels in the series of images (operation 802). In this example, the temporal filter is a 15 Hz temporal filter. As depicted, the temporal filter is utilized to remove or attenuate frequencies that are not of interest. In this example, the filter produces an image with pixel values that are proportional to a power spectral density (PSD) at 15 Hz. A determination is made as to whether a pixel is present that has an intensity that is greater than a selected threshold for a presence of an aircraft (operation 804).

As a non-limiting example of selecting a threshold, a 3-by-3-pixel averaging operator may be applied to the 15 hertz PSD image. This produces an image with pixel values that are proportional to the local average 15 Hz PSD, which may be higher for image regions where the background has high spatial frequencies or when the camera is moving faster relative to terrain. A threshold for each pixel can be computed by (1) estimating the difference between the equivalent isotropic radiated power (EIRP) of the flashing lamp during its high-intensity interval and the EIRP of the flashing lamp during its low intensity interval, (2) computing the change in value of a pixel in a 15 Hz PSD image produced by the estimated difference in EIRP viewed at the range where detection of other aircraft is required, and (3) adding the computed change in pixel value to the local 3×3 averaged PSD value.

As depicted, many of the resulting pixels have values below a threshold that indicate the presence of an aircraft. If a pixel is present above a selected threshold, then a remote aircraft may be present. If a pixel is not present above a selected threshold, then the process terminates.

If a pixel is present above the selected threshold, the process determines whether a desired separation is present between the aircraft and a remote aircraft (operation 806). If a desired separation is absent, the process performs a set of actions (operation 808). The process terminates thereafter. In this illustrative example, the set of actions can take a number of different forms. For example, the set of actions can include changing course to maintain separation, requesting the remote aircraft to change course, generating an alert, or other suitable actions. With reference again to operation 806, if a desired separation is present, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
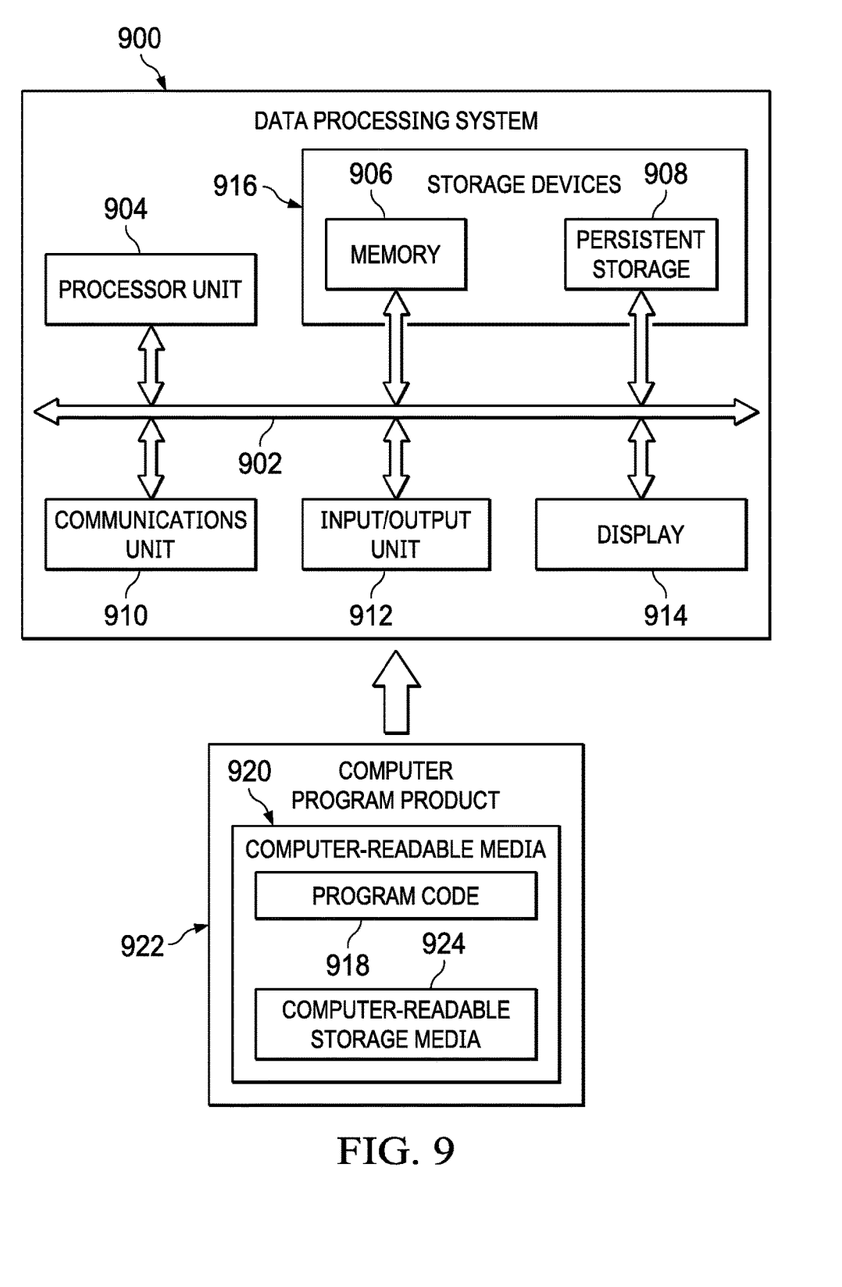
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 can be used to implement computer system 206. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 include one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Figure 10:
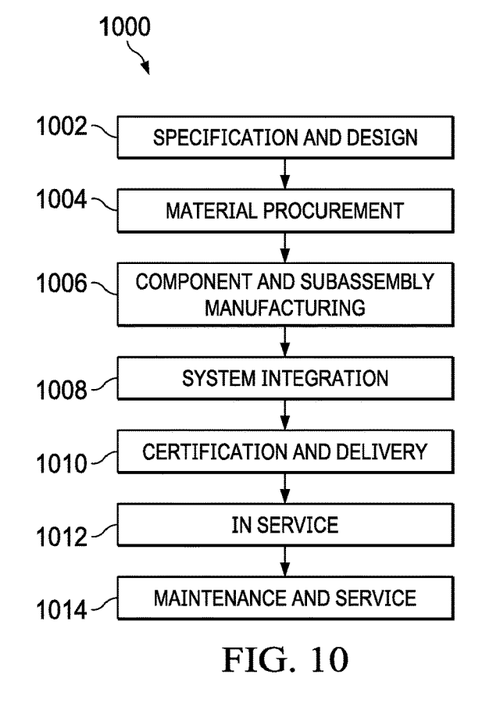
FIG. 10 is an illustration of a block diagram of an aircraft manufacturing and service method in accordance with an illustrative embodiment.
Figure 11:
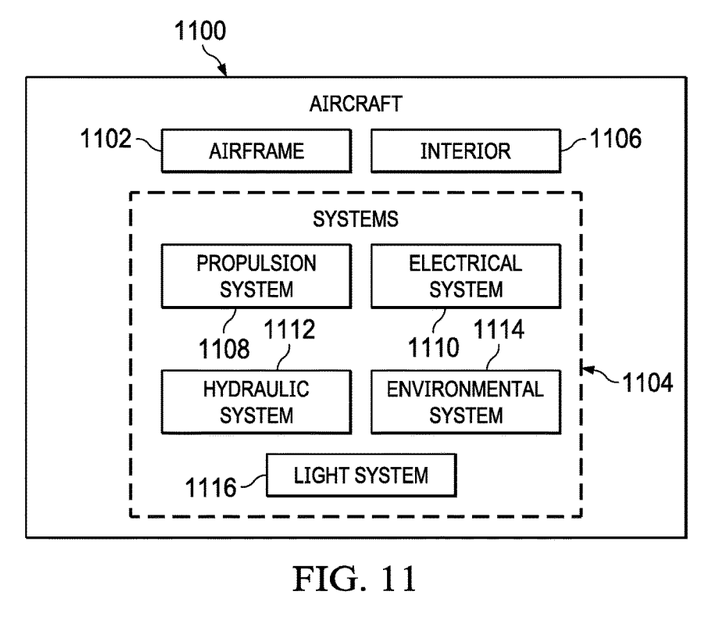
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, environmental system 1114, and light system 1116. In this illustrative example, light system 1116 may be implemented using light system 400 shown in block form in FIG. 4. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both.

For example, a light system including and a controller can be installed during system integration 1008. Further, one or more components for a light system controller can be installed on aircraft 1100 during maintenance and service 1014 as part of a refurbishment, an upgrade, or normal maintenance on aircraft 1100. The use of a number of the different illustrative embodiments may substantially expedite the assembly of aircraft 1100, reduce the cost of aircraft 1100, or both expedite the assembly of aircraft 1100 and reduce the cost of aircraft 1100.

Thus, illustrative examples provide a method, apparatus, and system for automated detection and avoidance for aircraft while also reducing sight pollution. In one illustrative example, lamps visible on an exterior of an aircraft are activated to emit light. An intensity of the light from the lamps is modulated at a set of frequencies that is detectable by a remote collision avoidance system in a remote aircraft during flight. This modulated light from the lamps at the set of frequencies is perceived as continuous by a person looking at the aircraft in a sky, reducing visibility of the aircraft in the sky to people on the ground.

One or more technical solutions are present in the illustrative examples that overcome a technical problem with reducing the visibility of aircraft to people on the ground. Further, one or more technical solutions are present that also overcome a technical problem with detecting other aircraft.

Thus, one or more illustrative examples can make detecting an aircraft easier using light with a change in intensity at a selected frequency as compared to current systems while reducing visibility to people looking at the sky. Other illustrative examples can also reduce the probability of bird strikes, transmit information, or some combination thereof.

As a result, one or more technical solutions may provide a technical effect of emitting light in a manner that is perceived as continuous by people on the ground such that the contrast between the aircraft and the sky is reduced while also committing the lights in a manner that allows other aircraft to distinguish the light from other sources. Thus, the illustrative examples provide an ability to allow detection of aircraft while also reducing sight pollution.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A lighting system comprising:
 a set of lamps visible on an exterior of a ground structure; and
 a controller that activates the set of lamps to emit light and modulates an intensity of the light at a set of frequencies detectable by a sensor system in an aircraft during flight of the aircraft and wherein the light from the set of lamps at the set of frequencies is perceived as continuous by a person looking at the set of lamps.

2. The lighting system of claim 1, wherein the ground structure is selected from a group consisting of a water tower, a radio tower, a wind turbine, a dam, and a building.

3. The lighting system of claim 1, wherein the set of lamps is selected from at least one of a light-emitting diode, a solid-state light emitter, a laser diode, a xenon flash lamp, a gas discharge lamp, or a halogen lamp.

4. A method for automating detection and avoidance for an aircraft, the method comprising:
 activating a set of lamps visible on an exterior of an aircraft to emit light; and
 modulating an intensity of light from the set of lamps at a set of frequencies that is detectable by a remote collision avoidance system in a remote aircraft during flight and wherein the light from the set of lamps at the set of frequencies is perceived as continuous by a person looking at the aircraft in a sky, reducing visibility of the aircraft in the sky;
 wherein the set of lamps visible on the exterior the aircraft is located on at least one of a port side relative to a direction of travel, a starboard side relative to the direction of travel, a leading edge of a wing, a trailing edge of the wing, a wing tip, or a waterline of a fuselage.

5. The method of claim 4, wherein the light from the set of lamps at the set of frequencies reduces a probability of a bird strike from birds viewing the light from the set of lamps.

6. The method of claim 4 further comprising:
 modulating the set of frequencies to transmit information.

7. The method of claim 6, wherein the information is selected from at least one of an aircraft identifier, an aircraft type, an altitude, a climb rate, a descent rate, a heading, a low fuel condition, a low battery condition, or an emergency condition.

8. The method of claim 4 further comprising:
 controlling a set of wavelengths of the light emitted from the set of lamps as the sky changes color to reduce visibility of the aircraft to the person looking at the aircraft in the sky.

9. The method of claim 4, wherein the set of frequencies is selected to indicate a location of the set of lamps visible on the exterior of the aircraft.

10. The method of claim 4 further comprising:
 controlling a camera for the aircraft to detect incoming light transmitted from a set of remote lamps visible on the remote aircraft, wherein the incoming light has a remote intensity that is modulated at a set of second frequencies; and
 identifying remote information from the incoming light based on the remote intensity modulated at the set of second frequencies.

11. The method of claim 4, wherein the aircraft is selected from a group consisting of an airplane, a commercial airplane, an unmanned aerial vehicle, a rotorcraft, a vertical take-off and landing vehicle, an electric vertical take-off and landing vehicle, a personal air vehicle, and a driverless personal air vehicle.

12. The method of claim 4, wherein the set of lamps is selected from at least one of a light-emitting diode, a solid-state light emitter, a laser diode, a xenon flash lamp, a gas discharge lamp, or a halogen lamp.

13. A method for automating detection and avoidance for an aircraft, the method comprising:
 activating a set of lamps visible on an exterior of an aircraft to emit light; and
 modulating an intensity of light from the set of lamps at a set of frequencies that is detectable by a remote collision avoidance system in a remote aircraft during flight and wherein the light from the set of lamps at the set of frequencies is perceived as continuous by a person looking at the aircraft in a sky, reducing visibility of the aircraft in the sky;
 wherein the set of frequencies is selected to indicate a location of the set of lamps visible on the exterior of the aircraft.

14. The method of claim 13, wherein the light from the set of lamps at the set of frequencies reduces a probability of a bird strike from birds viewing the light from the set of lamps.

15. The method of claim 13, further comprising:
 modulating the set of frequencies to transmit information.

16. The method of claim 15, wherein the information is selected from at least one of an aircraft identifier, an aircraft type, an altitude, a climb rate, a descent rate, a heading, a low fuel condition, a low battery condition, or an emergency condition.

17. The method of claim 13, further comprising:
 controlling a set of wavelengths of the light emitted from the set of lamps as the sky changes color to reduce visibility of the aircraft to the person looking at the aircraft in the sky.

18. The method of claim 13, further comprising:
 controlling a camera for the aircraft to detect incoming light transmitted from a set of remote lamps visible on the remote aircraft, wherein the incoming light has a remote intensity that is modulated at a set of second frequencies; and
 identifying remote information from the incoming light based on the remote intensity modulated at the set of second frequencies.

19. The method of claim 13, wherein the aircraft is selected from a group consisting of an airplane, a commercial airplane, an unmanned aerial vehicle, a rotorcraft, a vertical take-off and landing vehicle, an electric vertical take-off and landing vehicle, a personal air vehicle, and a driverless personal air vehicle.

20. The method of claim 13, wherein the set of lamps is selected from at least one of a light-emitting diode, a solid-state light emitter, a laser diode, a xenon flash lamp, a gas discharge lamp, or a halogen lamp.

* * * * *